US010681073B2

(12) United States Patent
Sofer et al.

(10) Patent No.: US 10,681,073 B2
(45) Date of Patent: Jun. 9, 2020

(54) DETECTING UNAUTHORIZED USER ACTIONS

(71) Applicant: International Business Machines Corporation, Armonk, NY (US)

(72) Inventors: Oded Sofer, Midreshet Ben Gurion (IL); Ofer H. Biller, Midreshet Ben Gurion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 15/860,240

(22) Filed: Jan. 2, 2018

(65) Prior Publication Data

US 2019/0207964 A1    Jul. 4, 2019

(51) Int. Cl.
*H04L 29/06* (2006.01)
*G06F 21/62* (2013.01)
*G06F 16/28* (2019.01)
*G06F 16/904* (2019.01)

(52) U.S. Cl.
CPC ........ *H04L 63/1425* (2013.01); *G06F 16/283* (2019.01); *G06F 16/904* (2019.01); *G06F 21/6218* (2013.01); *H04L 63/1466* (2013.01)

(58) Field of Classification Search
CPC ............ H04L 63/1425; H04L 63/1466; G06F 16/904; G06F 16/283; G06F 21/6218; G06F 21/566
See application file for complete search history.

(56) References Cited

U.S. PATENT DOCUMENTS

| 6,658,358 | B2 | 12/2003 | Hao |
| 6,658,359 | B2 | 12/2003 | Hubrich |
| 7,085,772 | B1 | 8/2006 | Sternemann |
| 7,265,755 | B2 | 9/2007 | Peterson |
| 8,683,389 | B1 | 3/2014 | Bar-Yam |
| 10,187,408 | B1 * | 1/2019 | Call .................. G06F 21/552 |
| 10,289,839 | B1 * | 5/2019 | Bedekar ............. G06F 3/04883 |
| 2003/0200464 | A1 * | 10/2003 | Kidron ............... H04L 63/0218 726/22 |
| 2008/0301155 | A1 * | 12/2008 | Borgsmidt ............ G06Q 10/04 |

(Continued)

FOREIGN PATENT DOCUMENTS

JP    2016126557 A    7/2016

OTHER PUBLICATIONS

Moere, et al.; "Visualizing Abstract Information using Motion Properties of Data-Driven Infoticles"; Proceedings of the SPIE; vol. 5295; 2004; 12 pages; <http://infoscape.org/publications/spie04.pdf>.

(Continued)

*Primary Examiner* — Matthew Smithers
(74) *Attorney, Agent, or Firm* — Steven L. Nichols; Fabian VanCott (57) ABSTRACT

In some examples, a system or detecting unauthorized user actions can include a processor to identify a plurality of objects and at least one user event to be monitored. The processor can also map the plurality of objects and the at least one user event to separate hyperplanes of a multi-dimensional visualization and apply at least one force to the plurality of objects. Additionally, the processor can detect as malicious user based on a movement of at least one of the objects as a result of applying the at least one force, and execute a security command to prevent the malicious user from accessing data.

20 Claims, 6 Drawing Sheets

(56) References Cited

U.S. PATENT DOCUMENTS

| | | | | |
|---|---|---|---|---|
| 2011/0252032 | A1* | 10/2011 | Fitzgerald | H04L 63/20 |
| | | | | 707/737 |
| 2012/0023109 | A1 | 1/2012 | Sternemann | |
| 2014/0039274 | A1* | 2/2014 | Sarrafzadeh | A61B 5/1118 |
| | | | | 600/300 |
| 2014/0283067 | A1* | 9/2014 | Call | H04L 63/1425 |
| | | | | 726/23 |
| 2014/0283068 | A1* | 9/2014 | Call | H04L 63/1425 |
| | | | | 726/23 |
| 2017/0103194 | A1* | 4/2017 | Wechsler | G06F 21/316 |
| 2017/0351859 | A1* | 12/2017 | Antonov | G06F 21/566 |
| 2019/0180398 | A1* | 6/2019 | Chen | G06K 9/00 |

OTHER PUBLICATIONS

Wikipedia.com, "Force-Directed Graph Drawings", date viewed Oct. 2, 2017, 6 pages, <https://en.wikipedia.org/wiki/Force-directed_graph_drawing>.

Wikipedia.com, "Data Transforms", date viewed Oct. 2, 2017, 21 pages, <http://gitub.com/vega/vega/wiki/Data-Transforms>.

Borner, et al.; Visualizing the spatial and temporal distribution of user interaction data collected in three-dimensional virtual worlds, IEEE Xplore: Nov. 7, 2012; 7; pages; <http://ieeexplore.ieee.org/document/1028752/?reload=true>.

Henry; "Mass-Spring-System Model for Real Time Expressive Behaviour Symthesis: Why and how to use physical model in Pure Date"; Oct. 2, 2017; 31 pages; <http://www.chnry.net/ch/IMG/pdf/-2.pdf>.

Eades, et al.; "A Force-Directed Method for Large Crossing Angle Graph Drawing"; CoRR, abs/1012.4559; 2010; 8 pages.

Eades, P.A.; "A Heuristic or Graph Drawing"; Congressus Numerantium; vol. 42; 1984; pp. 149-160.

Ronak Etemadpour, et al.; "Choosing Visualization Techniques for Multidimensional Data Projection Tasks: A Guideline with Examples"; 21 pages.

Justin Terry, et al.; "Indexing Method for MultiDimensional Vector Data"; Jun. 2013; ComSIS: vol. 10, No. 3; 28 pages.

* cited by examiner

DETECTING UNAUTHORIZED USER ACTIONS

BACKGROUND

The present disclosure relates to monitoring the transmission of data between users and storage locations, and more specifically, but not exclusively, to detecting unauthorized user actions.

SUMMARY

According to an embodiment described herein, a system for detecting unauthorized user actions can include a processor to identify a plurality of objects and at least one user event to be monitored. In some examples, the processor can also map the plurality of objects and the at least one user event to separate hyperplanes of a multi-dimensional visualization, and apply at least one force to the plurality of objects. Furthermore, the processor can detect a malicious user based on a movement of at least one of the objects as a result of applying the at least one force and execute a security command to prevent the malicious user from accessing data.

In some embodiments, a method for detecting unauthorized user actions can include indentifying a plurality of objects and at least one user event to be monitored and mapping the plurality of objects and the at least one user event to separate hyperplanes of a multi-dimensional visualization. Additionally, the method can include applying at least one force to the plurality of objects, detecting a malicious user based on a movement of at least one of the objects as a result of applying the at least one force, and executing a security command to prevent the malicious user from accessing data.

In yet another embodiment, a computer program product for detecting unauthorized user actions can include a computer readable storage medium having program instructions embodied therewith, wherein the computer readable storage medium is non-transitory or not a transitory signal per se. The program instructions can be executable by a processor to cause the processor to identify a plurality of objects and at least one user event to be monitored. The program instructions can also be executable by a processor to cause the processor to map the plurality of objects and the at least one user event to separate hyperplanes of a multi-dimensional visualization, apply at least one force to the plurality of objects, and detect a malicious user based on a movement of at least one of the objects as a result of applying the at least one force. Furthermore, the program instructions can be executable by a processor to cause the processor to execute a security command to prevent the malicious user from accessing data.

DETAILED DESCRIPTION

Many users access data from various local and remote sources and transmit data to any number of external sources. In some examples, the data can include confidential or sensitive information. In embodiments described herein, techniques can detect and monitor unauthorized users actions and prevent unauthorized access of data such as confidential information.

In some embodiments described herein, a device can identify a plurality of objects and at least one user event to be monitored. An object, as referred to herein, can include any computing device such as a local device, database server, or email server, among others, or any user or set of users. A user event can include any action performed by a user such as accessing a database, transmitting an email, accessing files from a device, and the like.

In some embodiments, a device can map the plurality of objects and the at least one user event to separate hyperplanes of a multi-dimensional visualization. A hyperplane, as referred to herein, can include any bounded two-dimensional space that includes representations of the objects of a same type. For example, users can be mapped locations within a first hyperplane and database servers can be mapped to locations within a second hyperplane. Additionally, the device can apply at least one force to the plurality of objects, and detect a malicious user based on a movement of at least one of the objects as a result of applying the at least one force. For example, if the force results in a user moving away from other users in a hyperplane due to accessing a database or transmitting data to a particular location, the user can be identified as a malicious user. In some embodiments, the device can identify a user as a malicious user based on a movement of a user within a hyperplane in addition to actions or screenshots of previous locations of the user. For example, if a force results in a user moving away from other users in a hyperplane due to accessing a database or transmitting data to a particular location, the user can be identified as suspicious and the location movement of the user together with previous user actions or screenshots of previous user actions can be analyzed to determine if the user has been mistakenly identified as a malicious user. Furthermore, the device can execute a security command to prevent the malicious user from accessing data.

Accordingly, the techniques described herein can prevent unauthorized access to data based on a location of a user within a hyperplane. For example, the techniques described herein can provide a visualization to identify malicious users and prevent a malicious user from receiving confidential information or performing an unauthorized action with confidential information.

Figure 1:
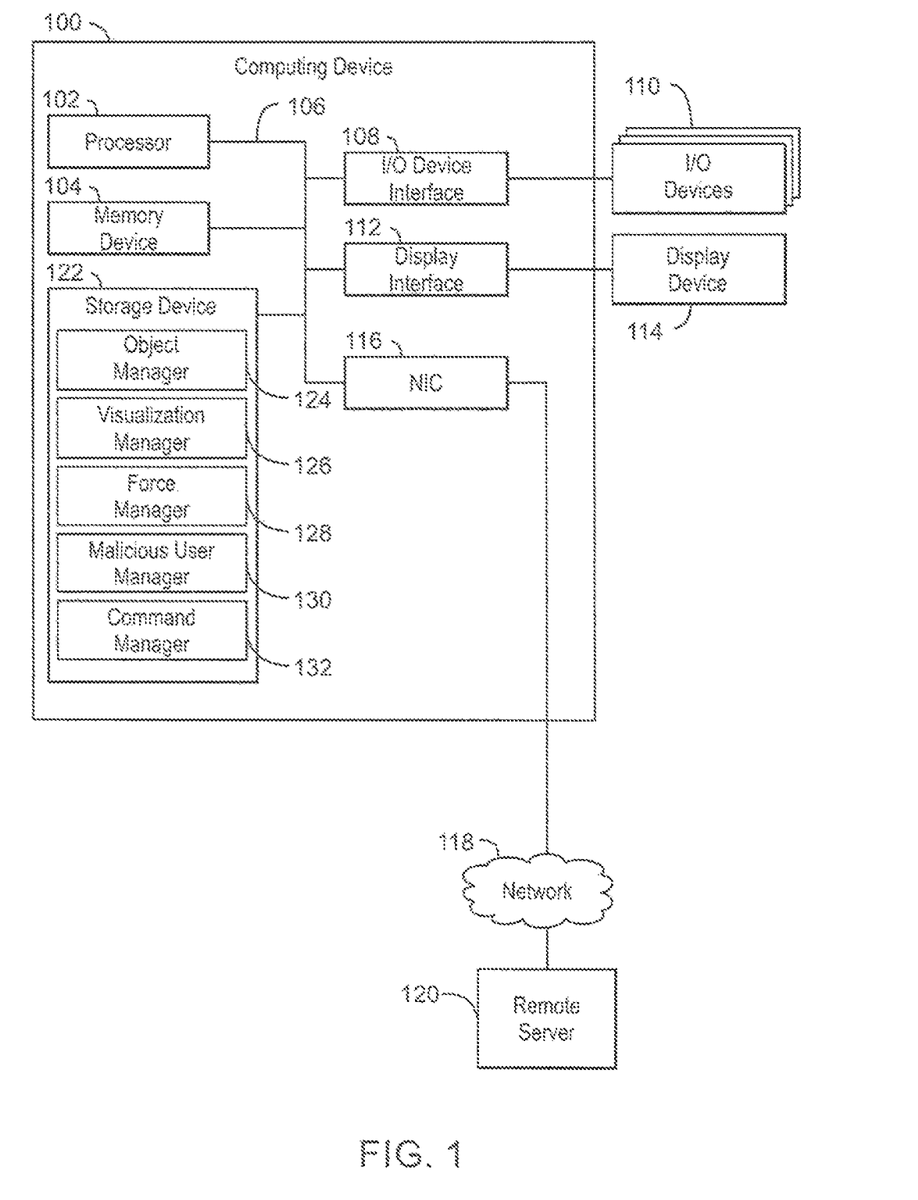
FIG. 1 depicts a block diagram of an example computing system that can detect unauthorized user actions according to an embodiment described herein.

With reference now to FIG. 1, an example computing device is depicted that can detect unauthorized user actions. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The process 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among other, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include an object manager 124, a visualization manager 126, a force manager 128, a malicious user manager 130, and a command manager 132. In some embodiments, the object manager 124 can identify a plurality of objects and at least one user event to be monitored. In some embodiments, the visualization manager 126 can map the plurality of objects and the at least one user event to separate hyperplanes of a multi-dimensional visualization. In some embodiments, the force manager 128 can apply at least one force to the plurality of objects. In some embodiments, the malicious user manager 130 can detect a malicious user based on a movement of at least one of the objects as a result of applying the at least one force. In some embodiments, the command manager 132 can execute a security command to prevent the malicious user from accessing data.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules additional network interfaces, etc.). Furthermore, any of the functionalities of the object manager 124, visualization manager 126, force manager 128, malicious user manager 130, and command manager 132 may be partially, or entirely, implemented in hardware and/or in the processor 102. For example, the functionality may be implemented with an application specific integrated circuit, logic implemented in an embedded controllers, or in logic implemented in the processor 102, among others. In some embodiments, the functionalities of the object manager 124, visualization manager 126, force manager 128, malicious user manager 130, and command manager 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
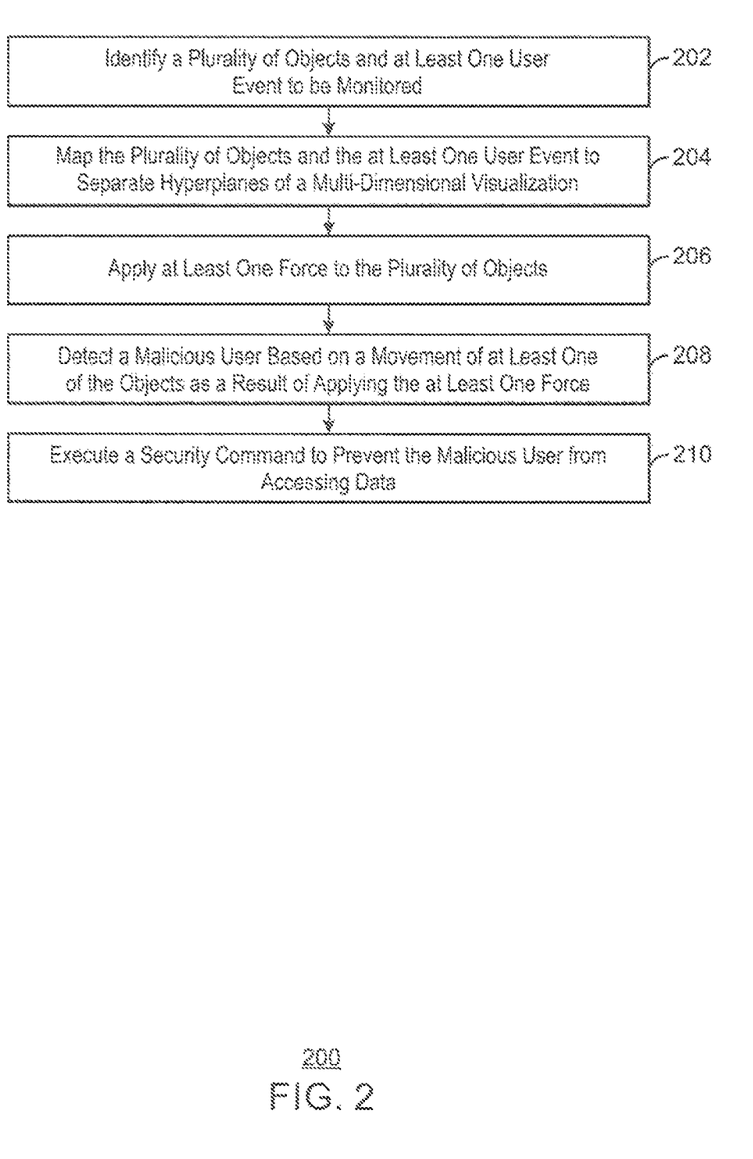
FIG. 2 is a process flow diagram of an example method that can detect unauthorized user actions according to an embodiment described herein.

FIG. 2 is a process flow diagram of an example method that can detect unauthorized user actions. The method 200 can be implemented with any suitable computing device, such as the computing device 100 of FIG. 1.

At block 202, an object manager 124 can identify a plurality of objects and at least one user event to be monitored. In some embodiments, the plurality of objects comprise a set of users and a set of databases accessed by the set of users. In some examples, the objects can correspond to any suitable email server, computing device, database, groups of users, source applications performing an event, and the like. The event can include any suitable user action such as accessing a database, transmitting an email to an external location, a type of command performed with an object such as an insert command, delete command, or update command, or accessing a local file or a remote file, among others.

In some embodiments, the object manager 124 can detect the transmission of data between a user or a local device and a database, email server, or the like, from a web browser, an application installed within a web browser such as a browser add-on, or from a remote database server. For example, the object manager 124 can reside on a remote server that processes database access requests. In some examples, the remote server can be an email server, among others. In some embodiments, the object manager 124 can reside in any suitable application and can monitor data accessed by a user or a device and monitor data transmitted from the user or the device to an external source. For example, the object manager 124 can detect a data query transmitted from a user to any number of external databases.

In some embodiments, the object manager 124 can hook into event calls or modify an operating system to detect a transmission of data from a local device to an external device. In some examples, the object a manager 124 can monitor, at a kernel level of the operating system, a plurality of system calls involving locally stored data and files. In some embodiments, hooking into an event call can include inserting hooks into a process that enables an application or operating system to intercept functions calls, messages, or events, among others, passed between various software components. For example, hooking into an event call can enable an application or process to intercept keyboard or mouse event messages before the keyboard or mouse messages reach an application. In some embodiments, the object manager 124 can modify an operating system to load an additional library module or modify the import table of an executable, which can enable the object manager 124 to detect any data transmitted to an external or remote source.

At block 204, a visualization manager 126 can map the plurality of objects and the at least one user event to separate hyperplanes of a multi-dimensional visualization. A hyperplane, as referred to herein, can include any suitable bounded two-dimensional plane corresponding to a set of objects of the same type. For example, a hyperplane can depict locations of users in a bounded two-dimensional plane, a set of databases accessed by users in the bounded two-dimensional plane, and the like. In some embodiments, the multi-dimensional visualization comprises a connecting line between two objects in separate hyperplanes involved in the at least one user event. For example, the visualization manager 126 can generate a line connecting a user in a first hyperplane to a database in a second hyperplane in response to detecting that the user has performed an event involving the database such as accessing the database, submitting a query to the database, or retrieving data from the database, among others. In some embodiments, the visualization manager 126 can modify a color, a size, a shape, or a line weight in the multi-dimensional visualization to indicate a different frequency of the at least one user event. In some examples, the multi-dimensional visualization can include any suitable number of hyperplanes. For example, the multi-dimensional visualization can include a hyperplane depicting a set of users, a hyperplane depicting databases accessed by the users, and a hyperplane depicting files in remote storage locations accessed by the users, among others. In some examples, an initial location of an object in a hyperplane can be arbitrary and the location of the object can be modified based on forces described below in relation to block 206.

In some embodiments, the visualization manager 126 can group users in a hyperplane based on user behavior of users with a shared authorization level. For example, the visualization manager 126 can detect any suitable number of characteristics associated with an authorization level of each user. In some examples, the visualization manager 126 uses a data structure, such as a binary tree, vector, linked list, array, and the like, to store characteristics for each user. In some embodiments, the characteristics for each user can indicate a hierarchical relationship within a group of users. In some embodiments, the characteristics associated with each user can indicate whether a user has permission to access data from a local device or a remote device that hosts data, a file name corresponding to the data, a creation date of the data on a host device, a user or a group of users with administrative access to the data on the host device, and the like. In some examples, each hyperplane can include locations of users with a common authorization level.

At block 206, a force manager 128 can apply at least one force to the plurality of objects. In some embodiments, a force can be applied to objects depicted in one of two hyperplanes. In some examples, the force manager 128 can apply a force to an object based on a sum of attraction of a plurality of objects to a center of activity in the separate hyperplanes. In some embodiments, the center of activity includes a weighted average of the objects in one of the separate hyperplanes. In some embodiments, the force manager 128 can apply a force based on a repulsion of an object from additional objects within a predetermined distance. In some examples, the force manager 128 can apply a force based on a repulsion from a border of the separate hyperplanes. The repulsion from a border can prevent an object from drifting away from another object and beyond a border of a hyperplane. In some embodiments, the repulsion is based on an electrostatic repulsion force.

In some embodiments, a first hyperplane can correspond to databases and a second hyperplane can correspond to database users who access the databases. In one example, Equation 1 below can indicate forces applied on each database user:

$$\vec{F}_{obj}^{\,i} = (c_{pp})\vec{F}_{pp}^{\,i} + \vec{F}_{ng}^{\,i} + \vec{F}_{b}^{\,i} \qquad \text{Eq. 1}$$

In some embodiments, Cpp can be a predetermined constant or factor that controls as amount of influence of the center of activity of an object on a hyperplane. The variables Fpp, Fng, and Fb are described in greater detail below in relation to Equations 2, 3, and 4. In some embodiments, the forces of Equation 1 can also be applied to objects such as databases, among other. As illustrated below in Equation 2, $F_{pp}$ represents the total attraction force applied on a user by objects of another hyperplane such as databases, among others.

$$\vec{F}_{pp}^{\,i} = \beta \vec{F}_{new} + (1-\beta)\vec{F}_{pp}^{\,i-1} \qquad \text{Eq. 2}$$

In Equation 2, the force is updated on each user action corresponding to a database. The variable $F_{new}$ represents the attraction force directed towards the position of that database. Using an exponential decay formula, the total force can be updated by adding the influence of the new action, which gets a more substantial weight that older actions. In some examples, the beta variable, B, can indicate the strength of the force or effect for the new action relative to the influence of historical actions. In some examples, the beta variable is a predetermined constant that can be used to adjust a weight given to historic events. In some examples, the beta variable can be adjusted by a system administration application prior to runtime. In one example, a database user which has 20% of activity with database "C", 20% of activity using database "D", and 60% of activity with database "E", can be depicted based on an attraction to the average position between the database locations of databases C, D, and E, which can be weighted by the relative volume of the activity. In some embodiments, techniques described herein include exponential decay (as described in Eq. 2), which enables a device to "forget" older events or user actions while "remembering" more recent events or user actions without explicitly maintaining or storing a copy of the entire historic events.

In some embodiments, $F_{ng}$ of Equation 1 represents the summation of the repulsion force applied on an object (i) by each of the object's neighbors, which are the same type of object. Due to the fact that the objects of the same type are considered identical in their physical attributes such as mass, electric charge, and the like, the non-changing parts can be replaced with a constant k' as illustrated below in relation to Equation 3.

$$\vec{F}_{ng}^{\,i} = \sum_{j=i(j\neq i)}^{n} \frac{k\prime}{dist(i,j)^2} \hat{r}_{ij} \qquad \text{Eq. 3}$$

In Equation 3, variable $r_{ij}$ corresponds to a directional vector which stores the direction between the objects i and j. Additionally, the variable n represents the number of neighbors. In some embodiments, FOG represents a repulsion force applied on an object based on an electrostatic repulsion force such as Coulomb's law.

In some embodiments, $F_s$ of Equation 4 below represents a force applied on each object in order to constrain the object's movement in a two-dimensional space. For example, a border of the two-dimensional space of a hyperplane can be represented in an x direction as $bx_0$ to $bx_1$ and y direction as $by_0$ to $by_1$. In some embodiments, k' can be defined as a combination of physical values such as mass, Coulomb's constant, and the like.

$$\vec{F}_b^i = \frac{k''}{|x_i - bx_o|^2}\hat{x} + \frac{k''}{|x_i - bx_i|^2}-\hat{x} + \frac{k''}{|y_i - by_o|^2}\hat{x} + \frac{k''}{|y_i - by_i|^2}-\hat{y} \quad \text{Eq. 4}$$

In some embodiments, a balance between the constants $c_{pp}$, k' and k'' can tune the influence of each of the forces on the total force applied on an object. In each time step, the new speed ($v_t$) for each object can be calculated according to the total force ($F_{obj}^i$), and according to a velocity that the change in possession is calculated. For example, the velocity can correspond to a speed that a position of an object is changing as a result of a force. In some examples, Fb represents an electrostatic repulsion force applied as a sum of single dimensional border forces on an object based on a perpendicular distance.

At block 208, a malicious user manager 130 can detect a malicious user based on a movement of at least one of the objects as a result of applying the at least one force. For example, the malicious user manager 130 can detect if a user is located proximate a group of users in a first hyperplane and forces move the user away from the proximate group of users in response to user actions. For example, the user may attempt to access a database that is not accessed by the proximate group of users, transmit data to a source that is not accessed by the proximate group of users, access files that are not accessed by the proximate group of users, and the like. In some embodiments, the malicious user manager 130 can identify a user as a malicious user in response to detecting that the user has moved more than a predetermined distance from additional users or groups of users with similar characteristics. The characteristics can include the databases, files, email servers, and external sources that are accessed by the users.

At block 210, a command manager 132 can execute a security command to prevent the malicious user from accessing data. In some embodiments, the command manager 132 can block the malicious user from accessing a database. The command manager 132 can also generate an alert that the malicious user is unauthorized to access a database. Additionally, the command manager 132 can modify access rights for malicious user. In some examples, the command manager 132 can mask or redact information by replacing the sensitive information with pseudorandom alphanumeric characters. In some embodiments, the command manager 132 can log each user action of a malicious user for further investigation or auditing.

The process flow diagram of FIG. 2 is not intended to indicate that the operations of the method 200 are to be executed in any particular order, or that all of the operations of the method 200 are to be included in every case.

Figure 3:
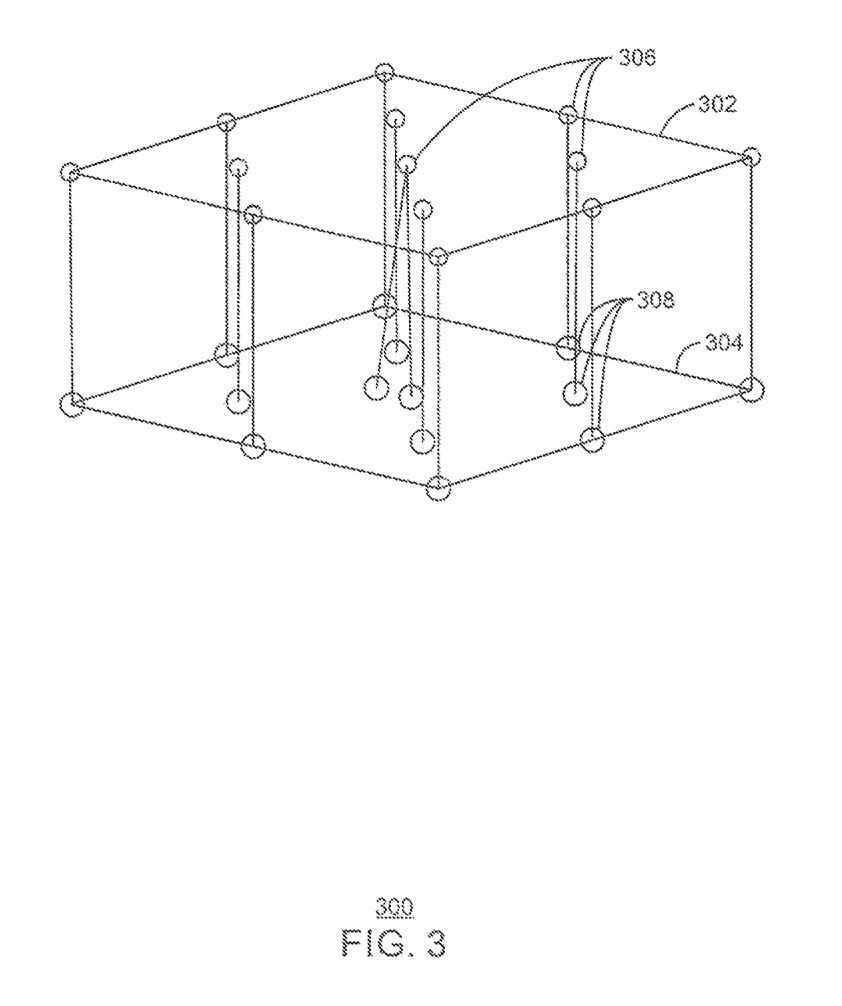
FIG. 3 is an example of a multi-dimensional visualization with two hyperplanes indicating user actions.

FIG. 3 is an example of a multi-dimensional visualization with two hyperplanes indicating user actions. The example multi-dimensional visualization 300 of FIG. 3 can be generated with any suitable computing device, such as the computing device 100 of FIG. 1. In some examples, the user actions can include authorized and unauthorized actions.

In some embodiments, the multi-dimensional visualization 300 can include any suitable number of hyperplanes such as hyperplanes 302 and 304. In one example, hyperplane 302 can indicate locations of objects 306, such as users, and hyperplane 304 can indicate locations of databases 308 accessed by the users. In some examples, the locations of the users 306 of hyperplane 302 and locations of the databases 308 of hyperplane 304 can be calculated based on Equations 1-4 discussed above in relation to FIG. 2. In some examples, each user 306 in hyperplane 302 can be mapped to one or more objects or databases 308 in hyperplane 304. For example, a user who accesses two databases may be mapped to the two databases in hyperplane 304. In some embodiments, a multi-dimensional visualization 300 can be stored based on a predetermined period of time. Each multi-dimensional visualization 300 can be analyzed in a combination with a movement of locations of users 306 in hyperplane 302. For example, as a user moves away from additional users in hyperplane 302 over time, the user can be designated as a malicious user.

The multi-dimensional visualization 300 of FIG. 3 is intended as an example and can include fewer or additional objects in hyperplanes 302 and 304. Additionally, the multi-dimensional visualization 300 can include any suitable number of additional hyperplanes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, and electronic storage device, a magnetic storage device, an optical storage device, an electromagnetic storage device, a semiconductor storage device, or any suitable combination of the foregoing. A non-exhaustive list of more specific examples of the computer readable storage medium includes the following a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable programs instructions described herein can be downloaded to respective computing/processing devices from a computer readable storage medium or to an external computer or external storage device via a network, for example, the Internet, a local area network, a wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using the Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises and article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based system that perform the specified functions or acts or carry out combinations of special purpose hardware and computer instructions.

Figure 4:
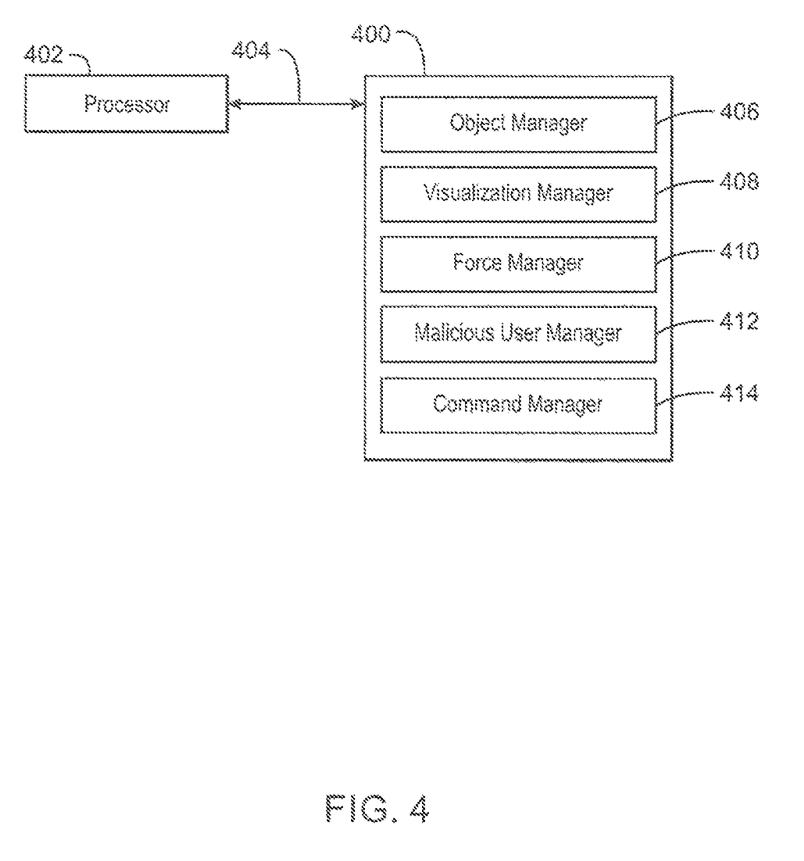
FIG. 4 is a tangible, non-transitory computer-readable medium that can detect unauthorized user actions according to an embodiment described herein.

Referring now to FIG. 4, a block diagram is depicted of an example of a tangible, non-transitory computer-readable medium that can detect unauthorized user actions. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, an object manager 406 can identify a plurality of objects and at least one user event to be monitored. In some embodiments, a visualization manager 408 can map the plurality of objects and the at least one user event to separate hyperplanes of a multi-dimensional visualization. In some embodiments, a force manager 410 can apply at least one force to the plurality of objects. In some embodiments, a malicious user manager 412 can detect a malicious user based on a movement of at least one of the objects as a result of applying the at least one force. In some embodiments, a command manager 414 can execute a security command to prevent the malicious user from accessing data.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
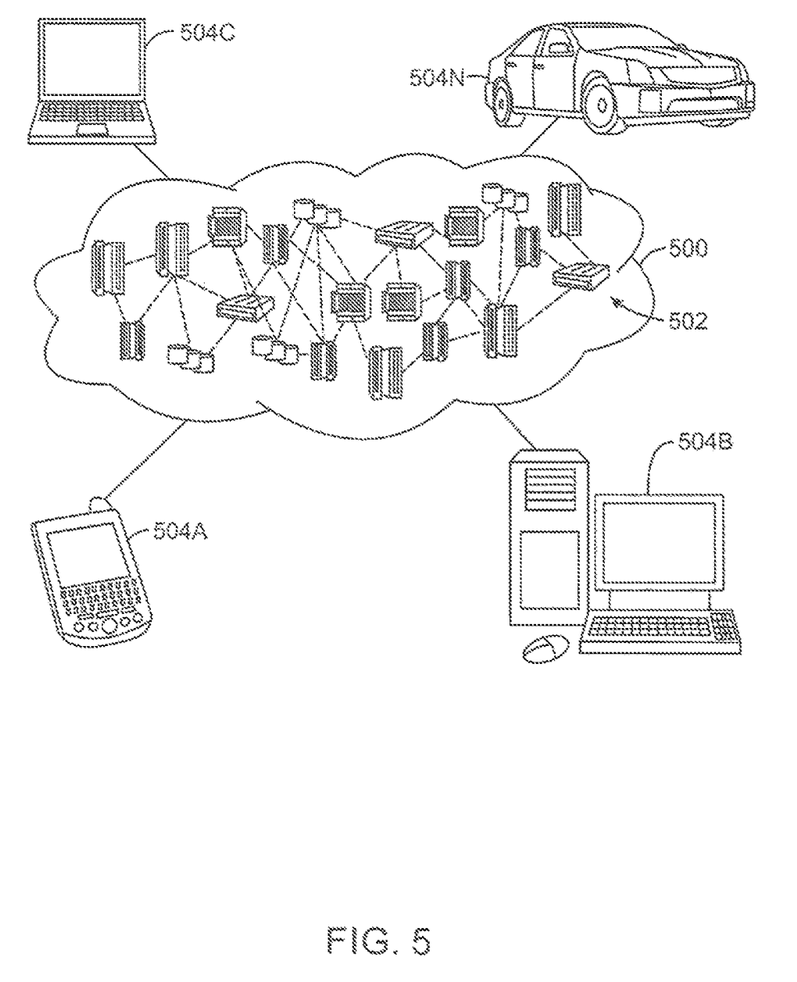
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows loud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
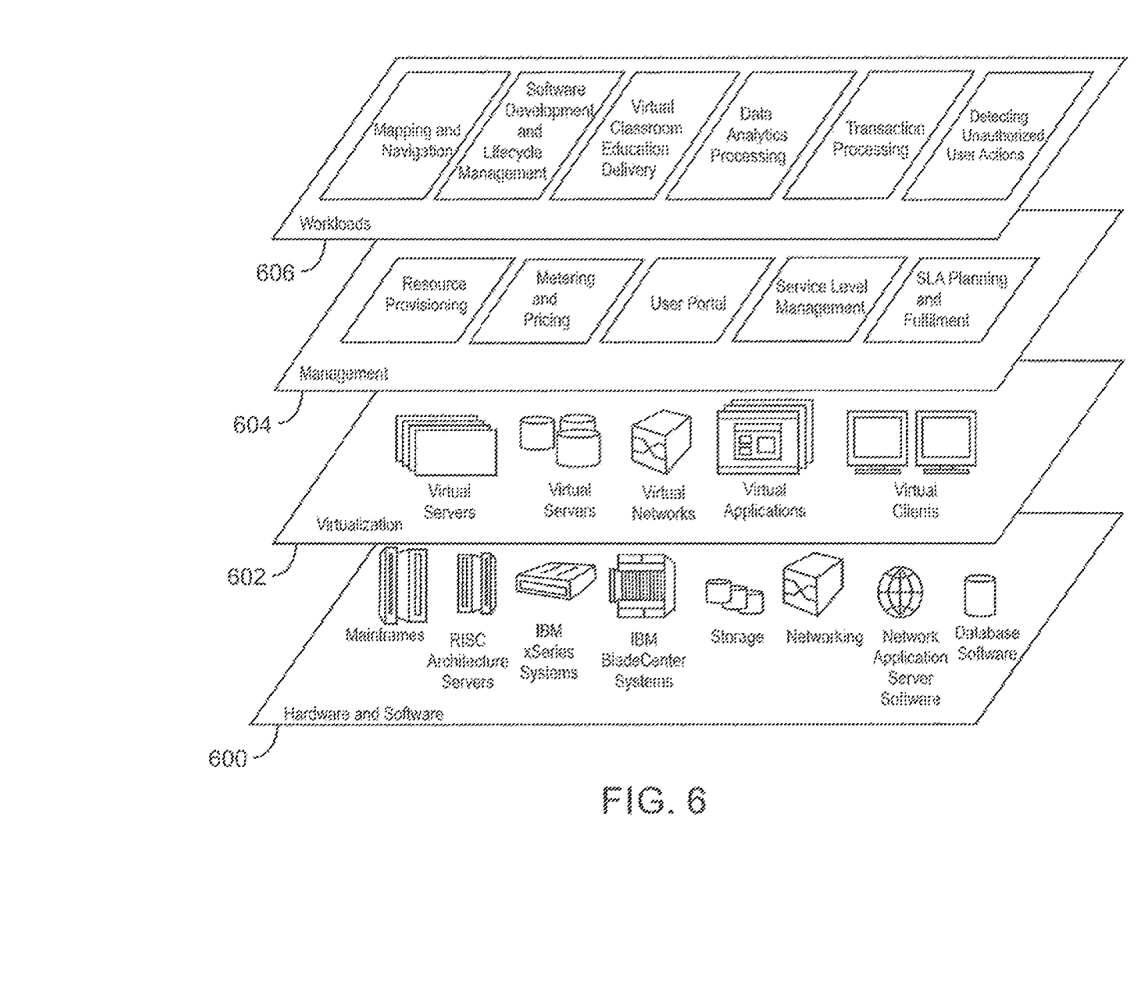
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual server; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and detecting unauthorized user actions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting unauthorized user actions comprising:
   a processor;
   a network interface for communication between the processor and a network,
   the processor to:
   identify a plurality of objects and at least one user event to be monitored;
   map the plurality of objects to separate hyperplanes of a multi-dimensional visualization and the at least one user event to the multi-dimensional visualization;
   apply at least one force to the plurality of objects;
   detect a malicious user based on a movement of at least one of the objects in the multi-dimensional visualization as a result of applying the at least one force; and
   execute a security command to prevent the malicious user from accessing data.

2. The system of claim 1, wherein the plurality of objects comprise a set of users and a set of databases accessed by the set of users.

3. The system of claim 1, wherein the multi-dimensional visualization comprises a connecting line between two objects involved in the at least one user event.

4. The system of claim 1, wherein the processor is to modify a color, a size, a shape, or a line weight in the multi-dimensional visualization to indicate a different frequency of the at least one user event.

5. The system of claim 1, wherein the at least one force comprises a sum of attraction of the plurality of objects to a center of activity in the separate hyperplanes.

6. The system of claim 5, wherein the center of activity comprises a weighted average of the objects in one of the separate hyperplanes.

7. The system of claim 1, wherein the at least one force comprises a repulsion of one of the plurality of objects from additional objects within a predetermined distance.

8. The system of claim 7, wherein the repulsion is based on an electrostatic repulsion force.

9. The system of claim 1, wherein the at least one force comprises a repulsion from a border of the separate hyperplanes.

10. The system of claim 1, wherein the security command comprises blocking the malicious user from accessing a database, generating an alert that the malicious user is unauthorized to access a database, or modifying access rights for malicious user.

11. A method for detecting unauthorized user actions comprising, with a computing device having a processor and memory and an interface to a network:
   identifying a plurality of objects and at least one user event to be monitored;
   mapping the plurality of objects and the at least one user event to separate hyperplanes of a multi-dimensional visualization;
   applying at least one force to the plurality of objects;
   detecting a malicious user based on a movement of at least one of the objects in a hyperplane as a result of applying the at least one force; and
   executing a security command to prevent the malicious user from accessing data.

12. The method of claim 11, wherein the plurality of objects comprise a set of users and a set of databases accessed by the set of users.

13. The method of claim 11, wherein the multi-dimensional visualization comprises a connecting line between two objects involved in the at least one user event.

14. The method of claim 11, comprising modifying a color, a size, a shape, or a line weight in the multi-dimensional visualization to indicate a different frequency of the at least one user event.

15. The method of claim 11, wherein the at least one three comprises a sum of attraction of the plurality of objects to a center of activity in the separate hyperplanes.

16. The method of claim 11, wherein the at least one force comprises a repulsion of one of the plurality of objects from additional objects within a predetermined distance.

17. The method of claim 11, wherein the at least one force comprises a repulsion from a border of the separate hyperplanes.

18. The method of claim 17, wherein the repulsion is based on an electrostatic repulsion force.

19. A computer program product for detecting unauthorized user actions, the computer program product comprising a non-transitory computer readable storage medium having program instructions embodied therewith, the program instructions executable by a processor to cause the processor to:

identify a plurality of objects and at least one user event to be monitored;

map the plurality of objects and the at least one user event to separate hyperplanes of a multi-dimensional visualization;

apply at least one force to the plurality of objects;

detect a malicious user based on a movement of at least one of the objects as a result of applying the at least one force; and execute a security command to prevent the malicious user from accessing data.

20. The computer program product of claim 19, wherein the security command comprises blocking the malicious user from accessing a database, generating an alert that the malicious user is unauthorized to access a database, or modifying access rights for malicious user.

* * * * *